US011526912B2

(12) United States Patent
Garthwaite et al.

(10) Patent No.: US 11,526,912 B2
(45) Date of Patent: Dec. 13, 2022

(54) MANAGING METADATA ENRICHMENT OF DIGITAL ASSET PORTFOLIOS

(71) Applicant: IRIS.TV INC., Los Angeles, CA (US)

(72) Inventors: Field J. Garthwaite, Los Angeles, CA (US); Thomas J. Sullivan, Los Angeles, CA (US)

(73) Assignee: IRIS.TV INC., Los Angeles, CA (US)

( * ) Notice: Subject to any disclaimer, the term of this patent is extended or adjusted under 35 U.S.C. 154(b) by 0 days.

(21) Appl. No.: 16/998,995

(22) Filed: Aug. 20, 2020

(65) Prior Publication Data

US 2022/0058694 A1 Feb. 24, 2022

(51) Int. Cl.
*G06Q 30/00* (2012.01)
*G06Q 30/02* (2012.01)
*G06F 16/908* (2019.01)

(52) U.S. Cl.
CPC ....... *G06Q 30/0271* (2013.01); *G06F 16/908* (2019.01); *G06Q 30/0277* (2013.01)

(58) Field of Classification Search
CPC ............ G06Q 30/0271; G06Q 30/0277; G06F 16/908
See application file for complete search history.

(56) References Cited

U.S. PATENT DOCUMENTS

| 2011/0251896 | A1* | 10/2011 | Impollonia | H04N 21/26603 705/14.55 |
| 2012/0290933 | A1* | 11/2012 | Rajaraman | G06F 16/7328 715/719 |
| 2013/0268351 | A1* | 10/2013 | Abraham | G06Q 30/0241 705/14.45 |
| 2015/0178930 | A1* | 6/2015 | Gao | G06T 7/70 382/103 |
| 2016/0026920 | A1* | 1/2016 | Sullivan | G06F 16/9535 706/11 |
| 2020/0005046 | A1* | 1/2020 | Attorre | G06K 9/00718 |
| 2020/0084483 | A1* | 3/2020 | Brown | H04L 9/3239 |

* cited by examiner

*Primary Examiner* — Meredith A Long
(74) *Attorney, Agent, or Firm* — Wong & Rees LLP; Zhichong Gu

(57) ABSTRACT

Contextual data may be generated from assets in asset portfolios using metadata enrichment services. A recommendation engine may generate a set of recommended assets for presentation in a content stream based on the contextual data. Brand safety may be implemented using a brand safety policy that uses the contextual data as indicators of potentially offensive content. Advertisements included in the content stream may also be targeted based on the contextual data.

21 Claims, 10 Drawing Sheets

MANAGING METADATA ENRICHMENT OF DIGITAL ASSET PORTFOLIOS

TECHNICAL FIELD

The present invention relates generally to data analytics, and in particular, to managing metadata enrichment of digital assets.

BACKGROUND

The proliferation of digital content such as video, photographical, audio, textual, etc., made available to online consumers has exploded. Digital content providers have attempted to predict how users will consume digital content and, further, which digital content will be consumed by a particular user. Correlations between user interests and user consumption have been used to attempt to predict what digital content the user will be interested in consuming. Other correlations between similar users or groups of users have also been used to attempt to make such predictions. Most approaches have been focused on the user's interests with little or no consideration of enriched metadata associated with the digital content and have not shown much success.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
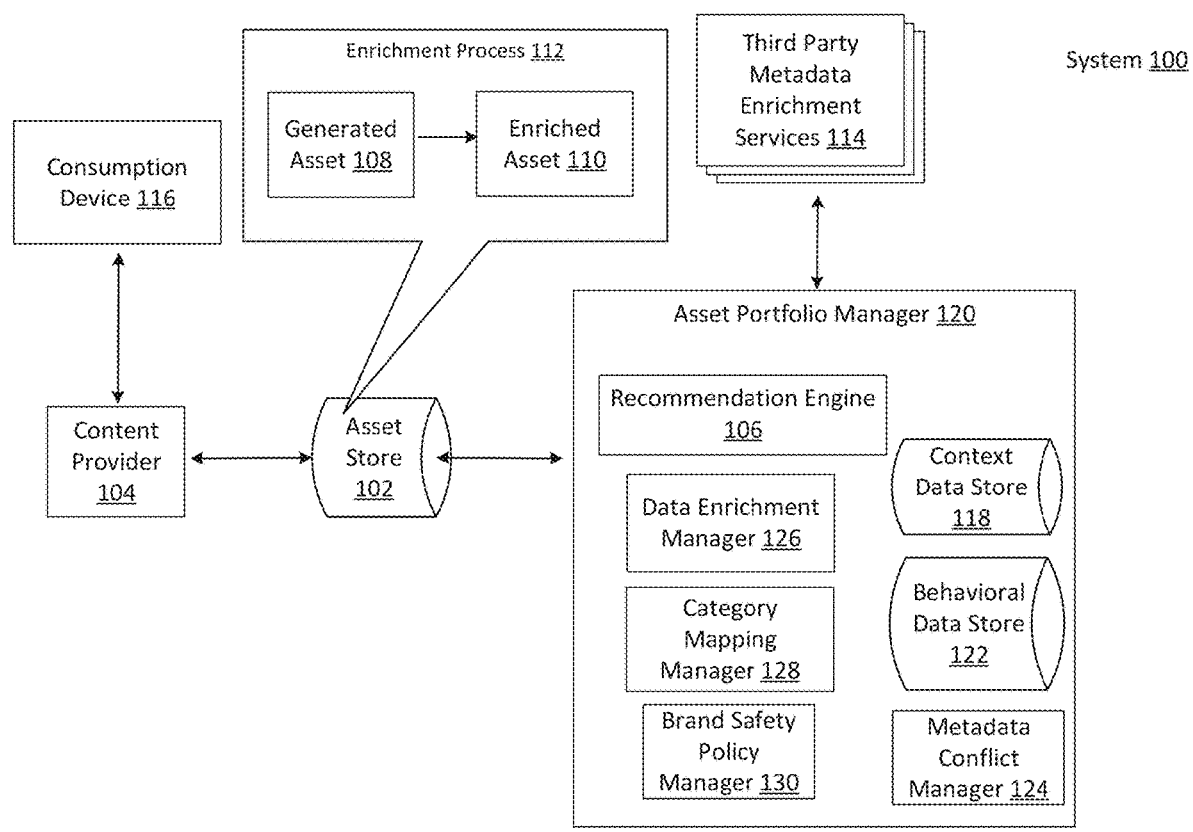
FIG. 1A illustrates an example high-level block diagram, including an example asset portfolio manager.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
3.0. Example Embodiments
4.0 Implementation Mechanism—Hardware Overview
5.0. Extensions and Alternatives

1.0 General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format and should be understood as merely a conceptual prelude to a more detailed description of example possible embodiments that follows below.

In an embodiment, assets in an asset portfolio are enriched with context metadata using one or more enrichment services. An enrichment service may be defined as a third-party entity that provides any kind or type of metadata about an asset. An asset may include a content item, such as a video clip, that includes standard metadata such as a title, description, length, and size. Context metadata may include descriptive information regarding images, concepts, sounds, or other entities present the content item or asset in the portfolio. For example, a content item may include a video clip of a bull rider in a rodeo competition. The rodeo competition may be televised on a particular television channel, such as ESPN. The transcript or spoken word delivered in real time of the content item may include the name of the competitor, the name of the competition, the location of the event, and so on. An enrichment service may include a company or service that provides the transcript or spoken word as metadata about the asset, which, in this example, is the video clip of the bull rider in the rodeo competition. One or more brand logos may be visually identified in one or more frames of the content item by another enrichment service, such as a logo prominently displayed as a sponsor of the rodeo competition, a brand patch worn by a participant, and logos displayed in the venue where the rodeo is taking place. Each brand may be visually detected by one or more metadata enrichment services, in one embodiment. Additionally, context metadata may include indicators of whether the content is: a) appropriate for a single user or a group of users sharing some characteristics (e.g., age, geographic region, etc.); b) allowed to be shown due to legal constraints and/or consistency with the other assets in the portfolio; and/or c) efforts to preserve brand safety that would prohibit, for example, display of a video showing a product brand of a competitor to the content provider. In some embodiments, multiple metadata enrichment services may be used.

An application programming interface (API) may be provided by a third-party metadata enrichment service to process a content item and extract metadata using various functionality, including image search, pattern recognition, speech to text natural language processing, and so on. Context metadata may also include a mood, such as bright, happy, light, somber, serious, violent, angry, and so on. The mood indicator may be provided by a third-party metadata enrichment service as part of the natural language processing of the transcript. Context metadata may also include a sentiment, such as positive, neutral or negative. The sentiment indicator may apply to the entire asset, a portion of the asset, or to specific entities/concepts associated with the assets and may be provided by a third-party metadata enrichment service as part of the natural language processing of the transcript. Context metadata may also include stance (e.g., political, supporting, non-supportive, etc.), audience suitability (e.g., age, gender, geolocation, etc.) and authenticity of the content (e.g., a verified unaltered video vs. a deep fake, etc.). Because multiple enrichment services may be used, different and sometimes conflicting metadata may be extracted. For example, a video clip about basketball may be classified as related to soccer based on an enrichment service's visual cognition service identifying the basketball incorrectly as a soccer ball.

Brand safety refers to a process and measures that are taken to protect the image and reputation of brands from damaging or inappropriate content when advertising online. When defining brand safe content and advertising, the process involves a review of metadata, machine learning models, keywords, segments, and themes that are in conflict with the goals, objectives of a campaign, or philosophy and ethics of an advertiser, brand, or publisher. Achieving brand safe outcomes can be done in two ways: by positively targeting select keywords, keyword lists, data segments, categories, or what has also been referred to as whitelisting, or, through exclusion lists, block listing or what has been referred to as blacklisting. Some examples of brand safety data segments or content types includes obscenity, death, violence, sex or adult, crime, alcohol, tobacco, and drugs.

Brand safety may be managed for content items, or assets in a portfolio, published by a publisher. For example, a publisher, such as CNN, may want to programmatically display a warning to consumers or prohibit display of violent content included in a content item, for example, a news report of a bombing in Paris. Included in the example content item may be context metadata of relevant keywords extracted from the transcript, such as bombing, violence, death, and terrorism. Also included in the extracted context metadata may be an identifier of the Eiffel Tower in a portion of the content item. A brand safety policy may be implemented to mark or otherwise indicate that the specific news report video clip includes violent and/or potentially offensive material. This would protect the brand of another publisher seeking to include content items that have the Eiffel Tower or Paris as part of the content items' metadata.

Other types of policies may be generated based on context metadata. Returning to the rodeo example above, an energy drink advertiser may want to place their ad immediately after a clip where a competitor logo is identified. For example, a MONSTER energy drink logo may be worn by a bull rider in the televised rodeo competition. This logo may be identified and included as context metadata by an enrichment service. The context metadata may be made discoverable to an advertiser for a competitor of the MONSTER energy drink, such as RED BULL. Thus, the advertiser for RED BULL may select a midroll ad to be placed immediately after the MONSTER logo appears in the content item. Conversely, the selection of assets to be shown along with the clip with MONSTER may disallow the logos of any competing brands to be displayed. An ad placement policy may charge a premium, in an embodiment, based on the context metadata and competitive analysis.

As another example of a contextual placement, a particular political campaign may desire to reach consumers who are watching video content assets that have recently been presented with a news segment about the economy. For example, a political campaign marketing video may be placed immediately after an asset that is determined to include images, audio, metadata, or some other context data stored in the context data store 118 related to politics, economy, brand-safe news or any other targeting terms. As a result, the recommendation engine 106 may then place the video of the political campaign marketing message within a set of recommended assets based on the brand safety policy or intentional targeting using the context data generated by the enrichment services 114.

As another example of a contextual placement, a particular public service announcement for a city, state, region ZIP code or country code, may desire to reach consumers who are watching video content assets that have recently been presented with content that is relevant to a weather event, public health emergency, or other breaking news event. For example, a government or non-profit entity that has a video message may have the video message placed immediately before, after, or during a video asset that is determined to include images, audio, metadata, or some other context data stored in the context data store 118 related to entertainment, news, geo-specific stories or any other targeting parameters. As a result, the recommendation engine 106 may then place the video message of the public service announcement within a set of recommended assets based on reaching a certain percentage of the population, reach or frequency goals, or other policy and targeting parameters desired to achieve a certain impact within the broader population using the context data generated by the enrichment services 114.

Because multiple enrichment services may use different terminology when classifying similar concepts, an asset portfolio manager may programmatically use category mapping and conflict management to handle the multiple categories and metadata provided. For example, a sports category of "soccer" as classified by a first enrichment service may be classified as "football" by a second enrichment service. By using category mapping, a standardized category may be assigned for both categories. A category mapping may be defined as a standardization of other categories to handle the multiple categories that relate to a similar concept. Returning to this example, the "soccer" and "football" categories may be standardized, using a category mapping, to a "standard soccer" category, in an embodiment. Additionally, conflicting information may be managed using various business rules regarding likelihood of correctness based on information provided by the enrichment service. Enrichment service 114 provides a statistical probability that an asset belongs to a contextual category and/or if it is brand safe. The asset enrichment is accompanied by an assignment probability ranging from 0.0 to 1.0 where a value of 1.0 would indicate 100% likelihood that the asset belongs to the contextual category. Similarly, a 1.0 value for brand safety would indicate that the asset is 100% brand safe for a particular category and a value of 0.0 would indicate that there is a 0% likelihood that the asset is brand safe. The 0.0-1.0 continuous scale may be mapped to discrete ranges determined by the asset portfolio manager 120 or a brand safety policy manager 130. For example, if the probability is associated with brand safety, then the brand safety policy manager 130 may assign discrete ranges as; "Not brand safe" [0.0-0.25). "Possibly not brand safe" (0.25-0.75], and "Brand safe" (0.75-1.0]. The thresholds for the boundaries of the discrete 'brand safe' assessment can be determined by the brand safety policy manager 130 and possibly used to manage conflicts. There may be a single threshold, for example; "not brand safe" if the likelihood is less than 0.5 and "brand safe" if the likelihood is greater than or equal to 0.50. Discrete scales could similarly be used when assigning an asset to one or more contextual categories such as entertainment, sports, etc.

Other embodiments include, without limitation, a non-transitory computer-readable medium that includes processor-executable instructions that enable a processing unit to implement one or more aspects of the disclosed methods as well as a system configured to implement one or more aspects of the disclosed methods. Various modifications to the preferred embodiments and the generic principles and features described herein will be readily apparent to those skilled in the art. Thus, the disclosure is not intended to be limited to the embodiments shown but is to be accorded the widest scope consistent with the principles and features described herein.

2.0 Functional Overview

FIG. 1A shows a high-level block diagram of a system 100 according to an embodiment of the present disclosure. One or more of the below-described techniques may be implemented in or involve one or more computer systems. The system comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components. The computing environment in FIG. 1A is not intended to suggest any limitation as to scope of use or functionality of described embodiments. As used in FIG. 1A, the process has been illustrated as an abstraction to a few functions.

System 100 may include one or more consumption devices 116, an asset portfolio manager 120, an asset store 102, and a content provider 104. An asset portfolio manager 120 may be implemented by a computing system. Consumption device 116 may be operated by one or more users (not illustrated), such as a person viewing (e.g., consuming) digital media assets in a playlist on a mobile device. Digital media assets may include video files, audio files, and other content files being streamed by the consumption device 116, for example. Third party metadata enrichment services 114 exchange information with the asset portfolio manager 120 to enable an enrichment process 112 in which a generated asset 108 from a content provider 104 becomes an enriched asset 110, in an embodiment. An asset portfolio manager 120 may include a recommendation engine 106, a data enrichment manager 126, a category mapping manager 128, a brand safety policy manager 130, a metadata conflict manager 124, a behavioral data store 122, and a context data store 118, in an embodiment.

A recommendation engine 106 operating within the asset portfolio manager 120 selects a set of assets in the asset store 102 to present to the consumption device 116. Based on a scoring algorithm that incorporates the likelihood of the viewing user to continue viewing assets based on a previously viewed asset, the recommendation engine 106 determines which assets to be presented to the consumption device 116. The techniques described above are further described in a related application, "Digital Content Curation and Distribution System and Method," U.S. Pat. No. 8,635,220, filed on Apr. 20, 2012, hereby incorporated by reference.

In an embodiment that distributes digital content, a data attribute on the video can be derived from the image frame, audio or metadata and each data attribute can be stored as an hexadecimal number, blockchain, hashed string or other identifier associated with the video asset that can be streamed on different devices. Thus, each data attribute is associated with an identifier. Here, this could be implemented using a decision engine, such as recommendation engine 106, in advance of (e.g., before) the playback stream being created. For example, if a viewer clicks play on a video asset and the data for that video asset, in any form, is passed back to the server, and then based upon that video asset a video playback stream is manifested and delivered to an IP enabled device, before or after the current video asset.

Consumption device 116 may include an interface, such as a physical interface, a graphical interface (e.g., a graphical user interface, etc.), or a combination thereof. A graphical interface may be generated by consumption device 116, received from an asset portfolio manager 120, a content provider 104, or a combination thereof. For example, the consumption device 116 may include an operating system and a web browser application running on the operating system connected to the Internet. The web browser includes functionality to consume digital media assets provided by the content provider 104, such as a video streaming website or a music subscription service, for example. Additionally, an asset portfolio manager 120 may be integrated into a content provider 104 such that a playlist of recommended digital assets is presented in the graphical interface. The graphical interface may be updated or modified by consumption device 116, content provider 104, or asset portfolio manager 120 in response to interaction with the interface.

A behavioral data store 122 retains log data captured from consumption devices 116. For example, when the consuming user starts to view a clip, interacts with the graphical interface to move to the next clip, and finishes the next clip, these actions are captured from the consumption device 116. The behavioral data may be used by the recommendation engine 106 to adjust recommended assets based on the initial asset consumed in the stream. When an end consumer engages (e.g., clicks on) and streams a video, another video is selected to be streamed prior to the video clicked on by the end consumer, or subsequently after it is completed, and that decision is based upon behavioral data captured and stored as data attributes in the behavioral data store 122. These data attributes can be decided upon by the recommendation engine 106 to either not show (e.g., blacklist), or specifically target the placement of another asset (e.g., whitelist) into the video playback stream or set of recommended digital assets. As a result, in an embodiment, the recommendation engine 106 includes an ability to decide upon and thus deliver a video streaming experience to consumption devices 116 that serve the beneficial purposes of brand safety, brand suitability and/or other contextual targeting purposes of a sequence of unique video assets. Video assets may be displayed and streamed to the physical consumption device 116 based upon the decisioning, or recommendation, made based upon the context data stored in the context data store 118, regardless of how the asset was delivered. This includes both client side, server side and other contemplated forms of streaming video delivery where distinct video files are sequenced together in order to create a playback experience that may appear continuous or with little latency between two distinct video files playing back from their origin. While this example specifies video assets as the type of digital assets being consumed and recommended, other types of digital assets, such as text, graphical, and audio, may utilize the techniques and methods described.

A data enrichment manager 126 enables the enrichment process 112 to add information to a generated asset 108 to become an enriched asset 110. In an embodiment, the data enrichment manager 126 uses a third-party metadata enrichment service 114 to process a generated asset 108 frame by frame in conjunction with the decryption and encryption video content process. For example, a generated asset 108 may include a video content file that is encrypted in an MPEG format. A third-party metadata enrichment service 114 processes the generated asset 108 and generates metadata, or context data, associated with the generated asset 108. The video content file may include a news story about a terrorist attack in Paris with a voice over describing the attack and with a visual shot of the Eiffel Tower, for example. A third-party metadata enrichment service 114 may be requested to process the video content file through an application programming interface (API) managed by the data enrichment manager 126. Using the API, context data about the video content file, such as an image search process that recognizes the Eiffel Tower being included in the video content file within 5 seconds of a portion of the file, may be generated by the third-party metadata enrichment service 114 and stored within the context data store 118. Other context data may be generated by other third-party metadata enrichment services 114, such as a text transcript of the voiceover included in the video content file using speech to text recognition software and/or services. The text transcript is also saved as context data in the context data store 118 associated with the generated asset 108 in the asset store 102. In an embodiment, an asset portfolio manager 120 may include one or more metadata enrichment services as part of its platform.

A metadata conflict manager 124 handles situations where conflicting information is produced regarding the same asset. For example, an asset may be marked as "soccer" by a first enrichment service, and a second enrichment service may mark the asset as "basketball." A metadata conflict manager 124 may weigh the information presented and decide that the asset is more likely to be about basketball based on other metadata presented, such as description, transcript, and title data including the word "basketball" or "NBA," as an example. This metadata may be stored in the context data store 118 for each asset, in an embodiment. Similarly, the conflict manager may resolve issues with brand safety identification where various third parties provide different assessments of the suitability of the content.

A category mapping manager 128 maintains a standardized mapping hierarchy to manage situations where multiple metadata enrichment services 114 use different naming schemas for the same entity, category, or concept. For example, multiple metadata services 114 may classify a video content file with a basketball being dribbled as related to "basketball" by a first service and "NBA" by a second service. A category mapping manager 128 may be used to generalize a category such as "NBA" to include both basketball and the NBA, in an embodiment.

The data enrichment manager 126 may utilize multiple metadata enrichment services 114 to generate context data stored in the context data store 118 associated with a content file that is stored as an enriched asset 110 in the asset store 102. The enriched asset 110 may include links and/or references to the context data stored in the context data store 118, in an embodiment. In other embodiments, the enriched asset 110 may include one or more indicators, codes, and/or tags that provide context regarding the brand safety of the content file. Returning to the example, an indicator that the video content file is associated with terrorism or violence may be stored within the enriched asset 110 in the asset store 102 through the enrichment process 112 by the data enrichment manager 126 applying a brand safety policy managed by the brand safety policy manager 130.

A brand safety policy manager 130 enables administrators via the asset portfolio manager 120 to create and implement brand safety policies on behalf of brands and/or publishers of assets, such as a content provider 104 or advertisers that wish to insert advertisements between assets in a playlist or stream of assets for consumption by the consumption device 116. For example, a publisher of video assets, such as a travel website that advertises vacations to Paris, may want to present assets to a consumption device 116 that include references to the Eiffel Tower and Paris, but also exclude assets that are marked unsafe or include potentially offensive (for the travel website's purposes) content, such as violence, terrorism, crime, and other adult content. Thus, the brand safety policy for the travel website may include whitelisted concepts like the Eiffel Tower and Paris as well as blacklisted concepts such as violence, terrorism, crime, and other adult content. Conversely, another publisher of video assets, such as a different travel website advertising vacations to Paris, may not want to present assets in a consumption device 116 that include references to the Kremlin building and Moscow. Thus, the second publisher may have a different brand safety policy that excludes the concepts of the Kremlin building and Moscow. The two brand safety policies may thus be applied to both the publisher of video assets and another publisher seeking to target the same audience. The brand safety policy manager 130 may provide a user interface to enable each publisher to define the brand safety policy that meets the unique requirements of that publisher. Because context data is stored in the context data store 118 that includes an indication of the "unsafe" or "offensive content" of violence, terrorism, and other adult content, the recommendation engine 106 is able to apply the brand safety policy provided by the brand safety policy manager 130 in selecting which assets to be included in a video stream or set of recommended assets to be included in a playlist.

As another example of a brand safety policy, a particular advertising agency may desire to target consumers of video content assets that have recently been presented with a competitor's logo. For example, a Pepsi ad may be placed immediately after an asset that is determined to include a logo, reference, or some other context data stored in the context data store 118 related to soda, drinks, or any other targeting terms. As a result, the recommendation engine 106 may target placement of the Pepsi ad within a set of recommended assets based on the brand safety policy or intentional targeting using the context data generated by the enrichment services 114. Alternatively, a sponsor of an asset may include within its brand safety policy that no competitor ads be placed within a certain number of slots after the sponsored asset. For example, if a soda company sponsored a video content file, the brand safety policy manager 130 may include an ability to prevent competitors to present sponsored content immediately after the video content file sponsored by Dr. Pepper.

Figure 1B:
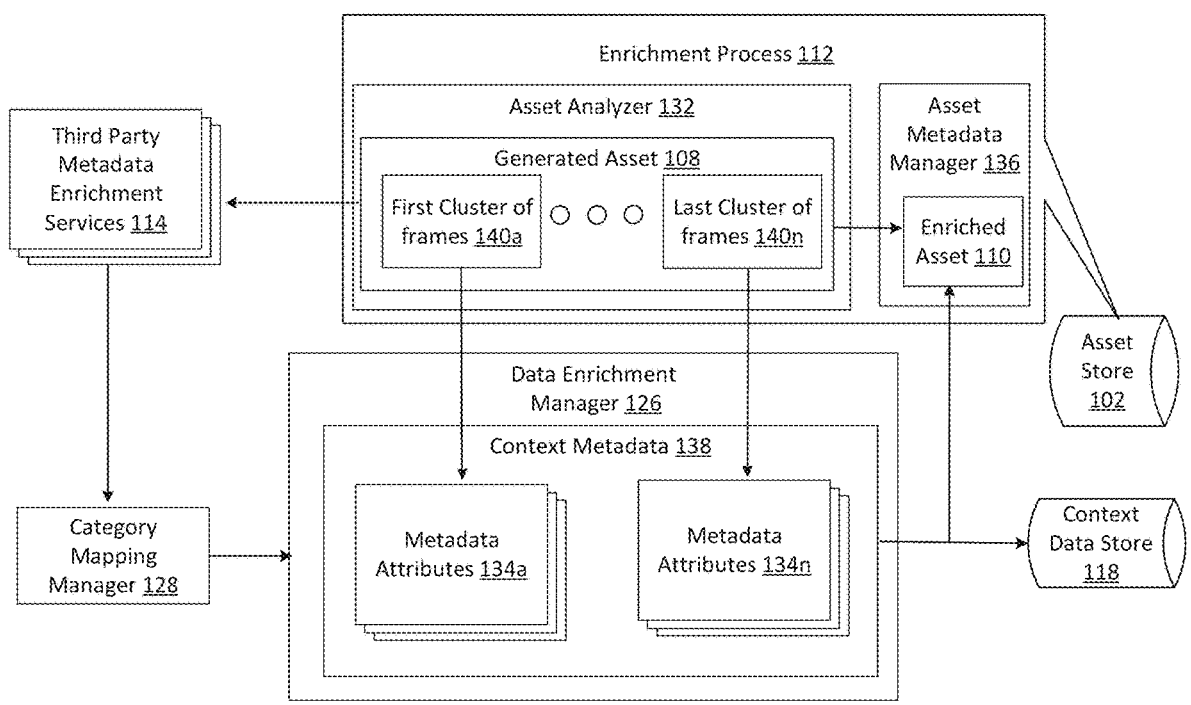
FIG. 1B illustrates an example high-level block diagram, including an example enrichment process.
Figure 1C:
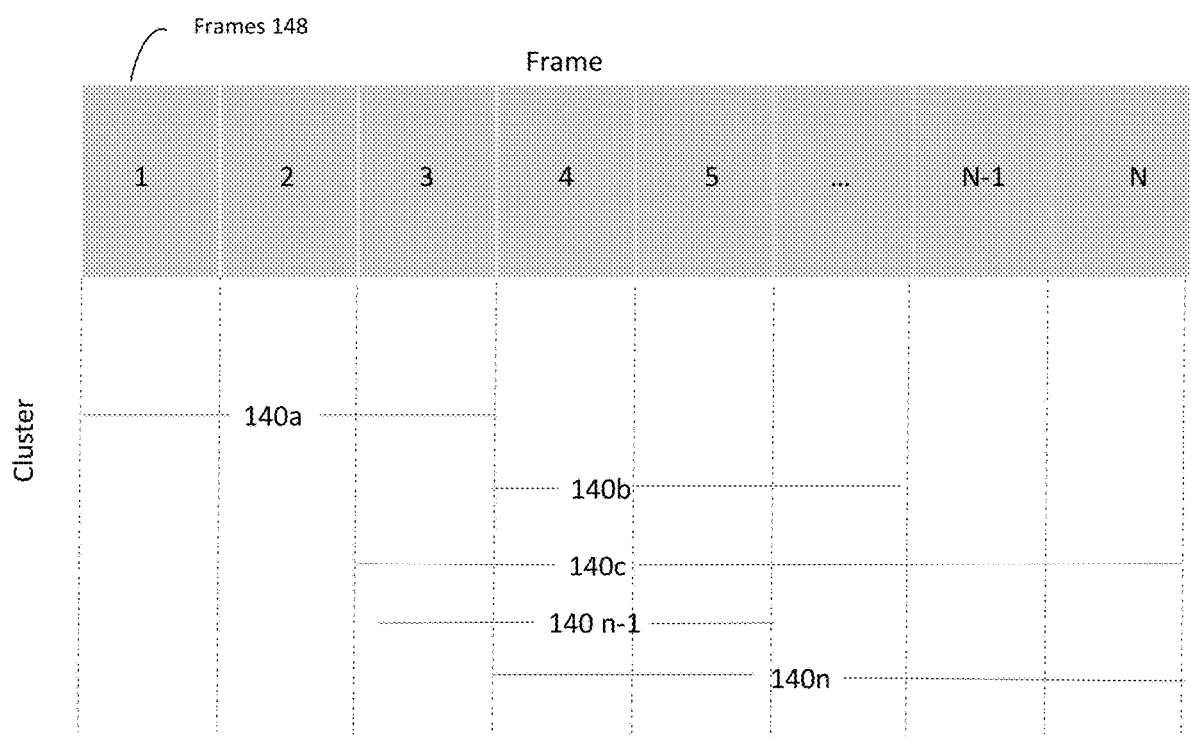
FIG. 1C depicts an example high-level block diagram, including an example clustering of frames.

FIG. 1B illustrates a high-level block diagram according to an embodiment of the present disclosure. The enrichment process 112 of FIG. 1A is further detailed in FIG. 1B and includes an asset analyzer 132 and an asset metadata manager 136. The data enrichment manager 126 of FIG. 1A is further detailed in FIG. 1B and includes a depiction of example context metadata 138 that includes a set of metadata attributes 134a and a set of metadata attributes 134n. As illustrated in FIG. 1B, a generated asset 108 may be analyzed by the asset analyzer 132 to determine clusters of frames that make up the generated asset 108, in an embodiment. A first cluster of frames 140a may be defined based on context data generated from a third party metadata enrichment service 114. For example, if the Eiffel Tower is recognized by an image recognition service, such as Google Image Search or Oracle GrapeShot, both third-party metadata enrichment services 114, the frames in which the Eiffel Tower appears can be grouped as a cluster by the asset analyzer 132. In this way, many clusters of frames, which may overlap, may be identified within the generated asset 108 by the asset analyzer 132. While the number of clusters are identified as a series (e.g., first cluster of frames 140a to last cluster of frames 140n), it is readily apparent that any number of clusters may be identified by the asset analyzer 132. As illustrated in FIG. 1C, a series of N frames can be grouped in clusters of frames 140. FIG. 1C depicts an example where the asset 108 containing N frames is clustered with n overlapping and non-overlapping number ranges. In an embodiment, the cluster of frames may be identified using timecodes. In a further embodiment, the cluster of frames may be identified by frame number ranges.

FIG. 1B and the other figures use like reference numerals to identify like elements. A letter after a reference numeral, such as "140a," indicates that the text refers specifically to the element having that particular reference numeral. A reference numeral in the text without a following letter, such as "140," refers to any or all of the elements in the figures bearing that reference numeral (e.g. "140" in the text refers to reference numerals "140a" through "140n" in the figures). As an example, n-numbered clusters of frames 140 are shown in FIG. 1B in order to simplify and clarify the description. In FIG. 1C, N-number of frames 148 are illustrated to further simply and clarify the description.

The context metadata 138 generated by metadata enrichment services, such as third-party metadata enrichment services 114 or other services accessed by the data enrichment manager 126, includes a set of metadata attributes 134a-134n that are associated with the clusters of frames 140a-140n. The context metadata 138 is associated with the generated asset 108 and is stored in the context data store 118. The context metadata 138 is also associated with the enriched asset 110 as a reference or link, in one embodiment. In another embodiment, the context metadata 138 is stored as part of the enriched asset 110. The asset metadata manager 136 creates the connection between the generated context metadata 138 and the enriched asset 110. The enriched asset 110 is stored and accessible in the asset store 102.

Figure 1D:
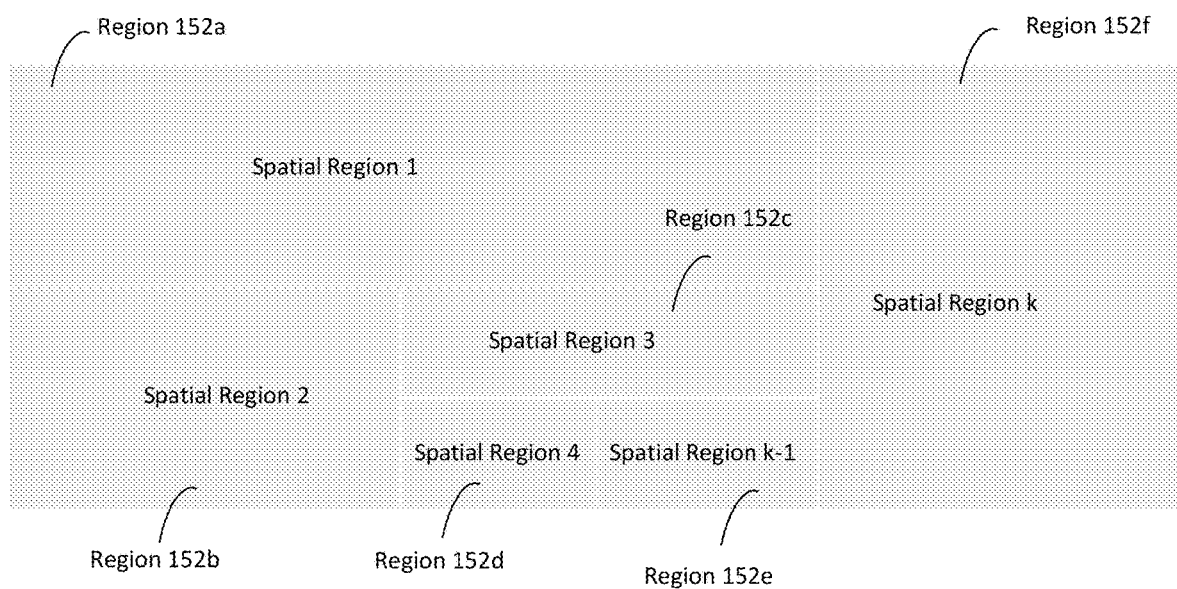
FIG. 1D depicts an example high-level block diagram, including an example division of spatial regions.

FIG. 1D depicts an example high-level block diagram, including an example division of a screen 150 into multiple spatial regions 152. In an embodiment, a screen 150 may be divided into spatial regions 152 by the asset portfolio manager 120. The regions may be divided based on a template, in one embodiment, based on known portions of the screen dedicated to different information (e.g., a stock market ticker at the bottom of a television screen). In another embodiment, the asset portfolio manager 120 may divide the screen 150 into k-number of spatial regions 152 based on a visual analysis of the frame. The number of regions may vary based on the frame, in an embodiment. Thus, contextual metadata may be captured based on a spatial clustering by region (e.g., the Eiffel Tower appears in spatial region 4).

Thus, embodiments provide a richer understanding of contextual information included in the assets of an asset store 102. The asset portfolio manager 120 generates a set of recommended assets that are more likely to be viewed by the consumption device 116 while also maintaining and applying any brand safety policies based on the context data, or context metadata 138, generated from an analysis of the assets in the asset store 102. This is different from user-based interest recommendation engines because the data being discovered here is contextual and are generated by metadata enrichment services 114, in an embodiment. Additionally, a category mapping manager 128 may receive input from multiple third-party metadata enrichment services 114 and apply a standardized category indicator or identifier to simplify the enrichment process 112. Accordingly, the richer analysis of assets provides, in aggregate and anonymized data, information that may better predict consumption of digital media assets. As such, embodiments provide better recommendations of digital media assets, greater user engagement, and better predictive insight of viewing user behavior based on context metadata.

Figure 2A:
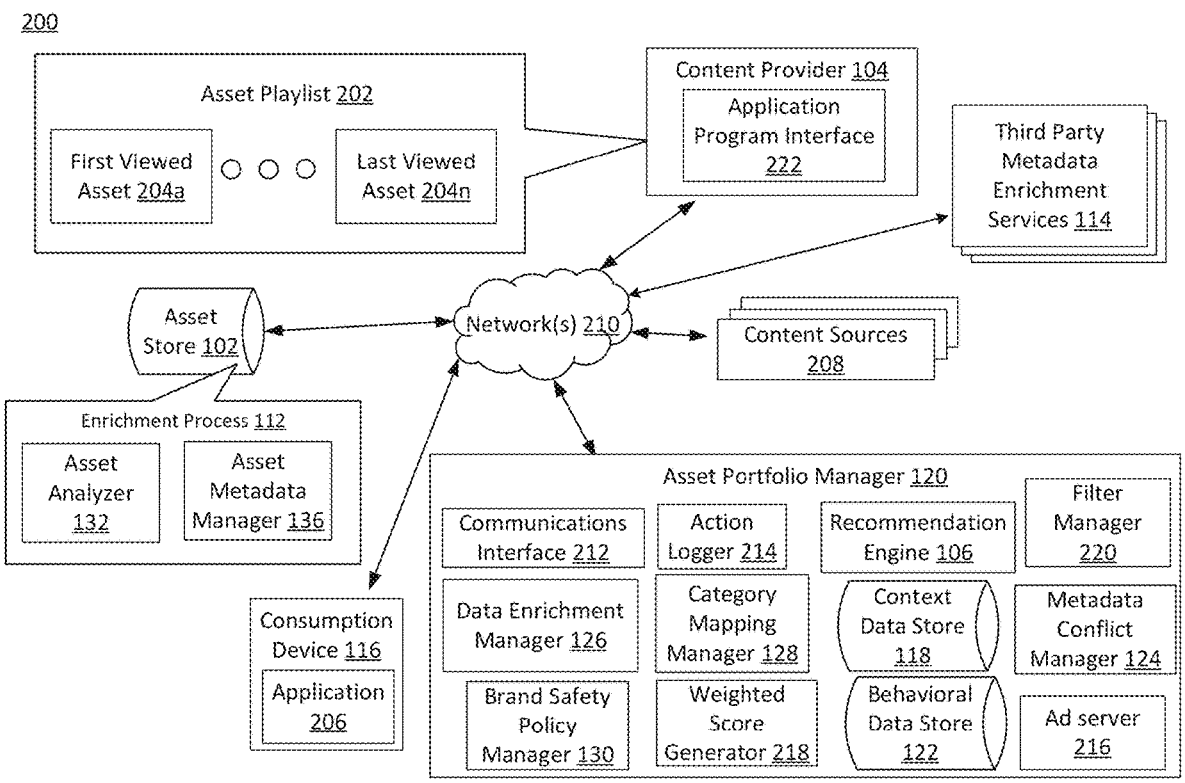
FIG. 2A illustrates an example high-level block diagram.

FIG. 2A illustrates an example high-level block diagram, in an embodiment. System 200 includes the asset portfolio manager 120 of FIG. 1 (e.g., 120) connected to an asset store 102, a content provider 104, content sources 208, and one or more consumption devices 116 via network 210 as part of a service (e.g., a cloud service) or application. In some embodiments, consumption device 116 may provide access to one or more applications 206 ("app"). App 206 may enable a user to access and perform services provided by asset portfolio manager 120. In some embodiments, app 206 may enable a user, to view digital media assets in an asset playlist 202. In particular, app 206 logs the consumption of digital media assets, or "views," as represented in the asset playlist 202 comprising a series of viewed assets including a first viewed asset 204a through a last viewed asset 204n. The asset playlist 202 represents what was provided by the content provider 104 through an application program interface (API) 222. In an embodiment, the asset playlist 202 may comprise a singular stream wherein the first viewed asset 204a through the last viewed asset 204n are included in a stream of content provided to the consumption device 116. In another embodiment, the asset playlist 202 may comprise a list of locations (e.g., URLs, etc.) wherein the first viewed asset 204a through the last viewed asset 204n are accessed by the consumption device 116 using the locations in the list.

Content sources 208 may exist separately from an asset store 102, in an embodiment. For example, content sources 208 may include a paid subscription service streaming video content made accessible to the user through the application 206 on the consumption device 116. The asset store 102 may include links or pointers to the streaming video content, a type of digital media asset, stored at a content source 208. As another example, content sources 208 may include a freemium (free and premium) audio streaming service that provides music and/or other audio content through a website. Content sources 208 may include any repositories and/or content providers 104 that distribute digital media assets through one or more networks 210, such as the Internet.

Consumption device 116 and asset portfolio manager 120 may be communicatively connected via one or more communication networks 210. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols, such as IEEE 802.XX suite of protocols, TCP/IP, IPX, SAN, AppleTalk, Bluetooth®, and other protocols.

Asset portfolio manager 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up asset portfolio manager 120 may run any of a number of operating systems or a variety of additional server applications and/or mid-tier applications, such as HTTP servers, FTP servers, CGI servers, Java servers, database servers, and the like. Exemplary database servers include without limitation those commercially available from MONGODB, CASSANDRA, and the like. In one example, asset portfolio manager 120 may include a Iris.tv™ product or service, such as Asset IQ™ which provides automated data structuring of assets, Adaptive Stream™ which provides video personalization to surface relevant assets that continue engagement with viewing users, IRIS Vision™ which includes business intelligence and programming management functionality, and Campaign Manager™ which provides management of branded content and other prioritized or sponsored content. In various embodiments, asset portfolio manager 120 may be configured to run one or more services or software applications described in the foregoing disclosure. For example, asset portfolio manager 120 may correspond to a computing system for performing processing as described herein according to an embodiment of the present disclosure.

In some embodiments, asset portfolio manager 120 may be implemented as an enterprise computing system or a cloud computing system comprising one or more computers and/or servers that may include those described above. Asset portfolio manager 120 may include several subsystems and/or modules, including some, which may not be shown. For example, asset portfolio manager 120 may include a communications interface 212, an action logger 214, a recommendation engine 106, a filter manager 220, a data enrichment manager 126, a category mapping manager 128, a context data store 118, a metadata conflict manager 124, a brand safety policy manager 130, a weighted score generator 218, a behavioral data store 122, and an ad server 216. Asset portfolio manager 120 may have more or fewer subsystems and/or modules than shown in the figure, may combine two or more subsystems and/or modules, or may have a different configuration or arrangement of subsystems and/or modules. Subsystems and modules of asset portfolio manager 120 may be implemented in software (e.g., program code, instructions executable by a processor, etc.), firmware, hardware, or combinations thereof. In some embodiments, the software may be stored in a memory (e.g., a non-transitory computer-readable medium, etc.), on a memory device, or some other physical memory and may be executed by one or more processing units (e.g., one or more processors, one or more processor cores, one or more GPUs, etc.).

In certain embodiments, asset portfolio manager 120 may also provide other services or software applications that can include non-virtual and virtual environments. In some embodiments, these services may be offered as web-based or cloud services or under a Software as a Service (SaaS) model to the users of consumption device 116. The services offered by asset portfolio manager 120 may include application services. Application services may be provided by asset portfolio manager 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in asset portfolio manager 120, which may be implemented as a cloud infrastructure system. Users can acquire the application services without the need for customers to purchase separate licenses and support. Various different SaaS services may be provided. Users operating consumption device 116 may in turn utilize one or more applications to interact with asset portfolio manager 120 to utilize the services provided by subsystems and/or modules of asset portfolio manager 120.

Asset portfolio manager 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in asset portfolio manager 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some embodiments, computer-readable storage media may be configured to protect a computer from an electronic communication containing malicious code. The computer-readable storage media may include instructions stored thereon, that when executed on a processor, perform the operations described herein.

System 200 may also include or be coupled to one or more data sources, which may be implemented using any type of persistent storage device, such as a memory storage device or other non-transitory computer readable storage medium. In some embodiments, local storage may include or implement one or more databases (e.g., a document database, a relational database, or other type of database), one or more file stores, one or more file systems, or combinations thereof. For example, system 200 may be coupled to or may include one or more content sources 208 or data repositories such as an asset store 102. The asset store 102 may be accessed through a third party, in an embodiment. Examples of repository systems include, without limitation, GitHub® and Apache Subversion® (SVN). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources may be accessible by asset portfolio manager 120 using network 210.

System 200 may also include or be coupled to additional storage, which may be implemented using any type of persistent storage device, such as a memory storage device or other non-transitory computer readable storage medium. In some embodiments, local storage may include or implement one or more databases (e.g., a content database, a relational database, an unstructured database, or other type of database), one or more file stores, one or more file systems, or combinations thereof. For example, system 200 may be coupled to or may include one or more data stores. Data stores may be included in or accessible by an asset portfolio manager 120. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The asset store 102 may be a network-accessible store accessible by asset portfolio manager 120 using network 210.

The asset portfolio manager 120 may include other functionality described in related applications, including "Presentation of Digital Media Assets Based on Assessed Value," U.S. Published Patent Application No. 2019/0043114, filed on Aug. 4, 2018 and "Digital Content Curation and Distribution System and Method," U.S. Pat. No. 8,635,220, filed on Apr. 20, 2012, both of which are hereby incorporated by reference.

A communications interface 212 enables data to be exchanged with the asset portfolio manager 120 via the network 210, in an embodiment. For example, the asset portfolio manager 120 may communicate data with a content provider 104 through an application programming interface (API) 222 and the communications interface 212. As another example, information including a set of recommended assets may be shared with the content provider 104 through another API. Further, consumption data 118, as illustrated in FIG. 1, may be received from the consumption device 116 through an API using the communications interface 212, in an embodiment, through the content provider 104. As another example, if the asset portfolio manager 120 is integrated with a content provider 104, the communications interface 212 may provide the set of recommended assets from the asset store 102 to the consumption device 116. The communications interface 212 may provide data through one or more web servers, in one embodiment.

A recommendation engine 106 generates a set of recommended assets for presentation to a viewing user operating a consumption device 116. The set of recommended assets is generated using a weighted linear combination of metrics. In one embodiment, the weights in the linear combination are determined by a weighted score generator 218. In another embodiment, the weights are determined by administrators via the asset portfolio manager 120. In some embodiments, the metrics may be based on context data stored in the context data store 118.

An action logger 214 stores actions taken by a consumption device 116 after presentation of the set of recommended assets, in an embodiment. The consumption device 116 operated by a viewing user may select one of the set of recommended assets to view, causing the asset to play on the consumption device 116. Upon completion of viewing the asset, such as a video, audio, or other digital media file, the consumption device 116 can indicate that a view has been completed (e.g., view complete). Other actions that may be logged include a selection of a thumbs up or a thumbs down, indicating user feedback on the viewed asset. Additionally, further actions may include a bounce (e.g., the user leaving the web site or closing the session), a skip (e.g., the user skipping to the next digital media asset in the playlist), a hop (e.g., the user selects a different digital media asset in the ordered set or playlist), etc. The action logger 214 stores the action taken associated in the behavioral data store 122.

A weighted score generator 218 determines a weighted composite score to rank candidate assets in an asset portfolio for consumption, in an embodiment. Weights are associated with the components that form the composite score in a linear combination. The optimal value of the weight can be determined in different ways. In one embodiment, machine learning may be used to determine the optimal value of a weight that places a higher value on observed data from past recommended assets. Machine learning may be used to determine the weight using the success rate of recommended assets. In another embodiment, weights may be explicitly set by administrators via the asset portfolio manager 120 for each customer. The weighted score generator 218 uses the weight to compute a composite score using various metrics as defined by the recommendation engine 106. The composite scores may then be used by the recommendation engine 106 to determine a set of recommended assets for consumption by the consumption device 116. Here, a component of the weighted linear combination that forms the composite score may include context data representing a concept. For example, a brand safety policy may blacklist any assets that include offensive or violent content. Thus, context data stored in the context data store 118 may be a component in the weighted linear combination of other components that form the composite score. Any number of components may be used to generate a set of recommended assets. Each component may comprise an indicator of a concept, such as brand safety, or other context data, such as inclusion of a keyword in a description, title, transcript, or image recognition, and so on. The weighted score generator 218 thus produces a composite score based on the weighted linear combination of the components as configured by administrators via the asset portfolio manager 120, in an embodiment.

Business criteria may be inputted by administrators via the asset portfolio manager 120, through a user interface in an application 206 operating on a consumption device 116. Business criteria may be communicated to the asset portfolio manager 120 in other ways, for example, through an application program interface 222 on a content provider 104 or using an application connected to the asset portfolio manager 120 through the communications interface 212, in various embodiments. Such business criteria may include explicit setting of a brand safety policy for a particular customer.

Filter manager 220 enables administrators to manage filters that are used to select the recommended set of assets by the recommendation engine 106, weighted score generator 218, and brand safety policy manager 130. For example, a business user of a service or application provided by the asset portfolio manager 120 may request that a brand safety policy include blacklisting assets that include violence, terrorism, and/or other offensive content. A blacklist may include certain keywords, a selection of common keywords associated with violence, terrorism, and/or other offensive content. In addition to keywords, blacklisting may be applied to additional types of metadata include asset genre, topic, category. Blacklisting may also be applied based on other enriching metadata, including contextual relevance, audience suitability (e.g., based on the viewer's age, geolocation, gender, etc.), sentiment, mood, and additional types of metadata that may be provided by the third party enrichment service including, but not limited to, tone (e.g., analytical, emotional, neutral, etc.), stance (e.g., supportive, non-supportive, political, biased, etc.), and confidence in the authenticity of the content (e.g., deep-fake videos, etc.). The blacklist of a brand safety policy may include a reference link to a third-party maintained resource of keywords associated with offensive content, in an embodiment. The brand safety policy may also include whitelisting assets that feature content related to various topics, such as lifestyle, entertainment, news, and sports. Whitelisting assets may be performed through the filter manager 220 in a manner similar to blacklisting assets, including keywords, references to dictionaries or other resources of keywords associated with various topics, and so on. As with blacklisting, the whitelisting of assets could be, in an embodiment, based on other enriching metadata, including contextual relevance, audience suitability (e.g., based on the viewer's age, geolocation, gender, etc.), sentiment, mood, and additional types of metadata that may be provided by the third party enrichment service including, but not limited to, tone (e.g., analytical, emotional, neutral, etc stance (e.g. supportive, non-supportive, political, biased, etc.), and confidence in the authenticity of the content (e.g., a verified authentic video versus deep-fake videos, etc.). Other filters that may be selected may include assets that have been generated in the past five days, as an example. Further, a filter for a particular type of sport may be selected, such as baseball. In this way, the filter manager 220 may be configured to enable selection of various types of filters, including receiving information regarding various brand safety policies.

Ad server 216 may receive as inputs various targeting criteria for sponsored content assets. Assets in the asset store 102 may include ads that monetize the context metadata or context data stored in the context data store 118. Various sponsored advertising techniques, such as auctions, reserve prices, and cost per engagement metrics may be implemented within the ad server 216. Using context data as targeting criteria for ad placement, the ad server 216 may deliver ads that are compliant with brand safety policies for a particular publisher or content provider 104 while also monetizing the context data generated by the enrichment process 112, data enrichment manager 126, and/or third party metadata enrichment services 114.

As another example, the last viewed asset 204n may include a recap video file of game 2 of the NBA Championship finals. Context data may be captured in the asset 204n that indicates a logo of a fast food chain appears on the screen prominently for 3 seconds. Because the context data associated with the fast food logo includes temporal data and position data by cluster of frames, a midroll ad may be served within the content stream that is being provided by the content provider 104. The midroll ad may be inserted as another asset that complies with any brand safety policies in effect. As a result, a new ad inventory space is created that is targetable based on the context data generated by the enrichment process 112. While an ad server 216 is illustrated here, ad networks and/or services may replace the ad server 216, where the targeting information is passed to the ad networks and/or services through one or more application programming interfaces (APIs).

As another example of a contextual placement, a particular political campaign may desire to reach consumers who are watching video content assets that have recently been presented with a news segment about the economy. For example, a political campaign marketing video may be placed immediately after an asset that is determined to include images, audio, metadata, or some other context data stored in the context data store 118 related to politics, economy, brand-safe news or any other targeting terms. As a result, the recommendation engine 106 may then place the video of the political campaign marketing message within a set of recommended assets based on the brand safety policy or intentional targeting using the context data generated by the enrichment services 114.

As another example of a contextual placement, a particular public service announcement for a city, state, region, ZIP code or country code, may desire to reach consumers who are watching video content assets that have recently been presented with content that is relevant to a weather event, public health emergency, or other breaking news event. For example, a government or non-profit entity that has a video message may be placed immediately before, after, or during a video asset that is determined to include images, audio, metadata, or some other context data stored in the context data store 118 related to entertainment, news, geo-specific stories or any other targeting parameters. As a result, the recommendation engine 106 may then place the video message of the public service announcement within a set of recommended assets based on reaching a certain percentage of the population, reach or frequency goals, or other policy and targeting parameters desired to achieve a certain impact within the broader population using the context data generated by the enrichment services 114.

Figure 2B:
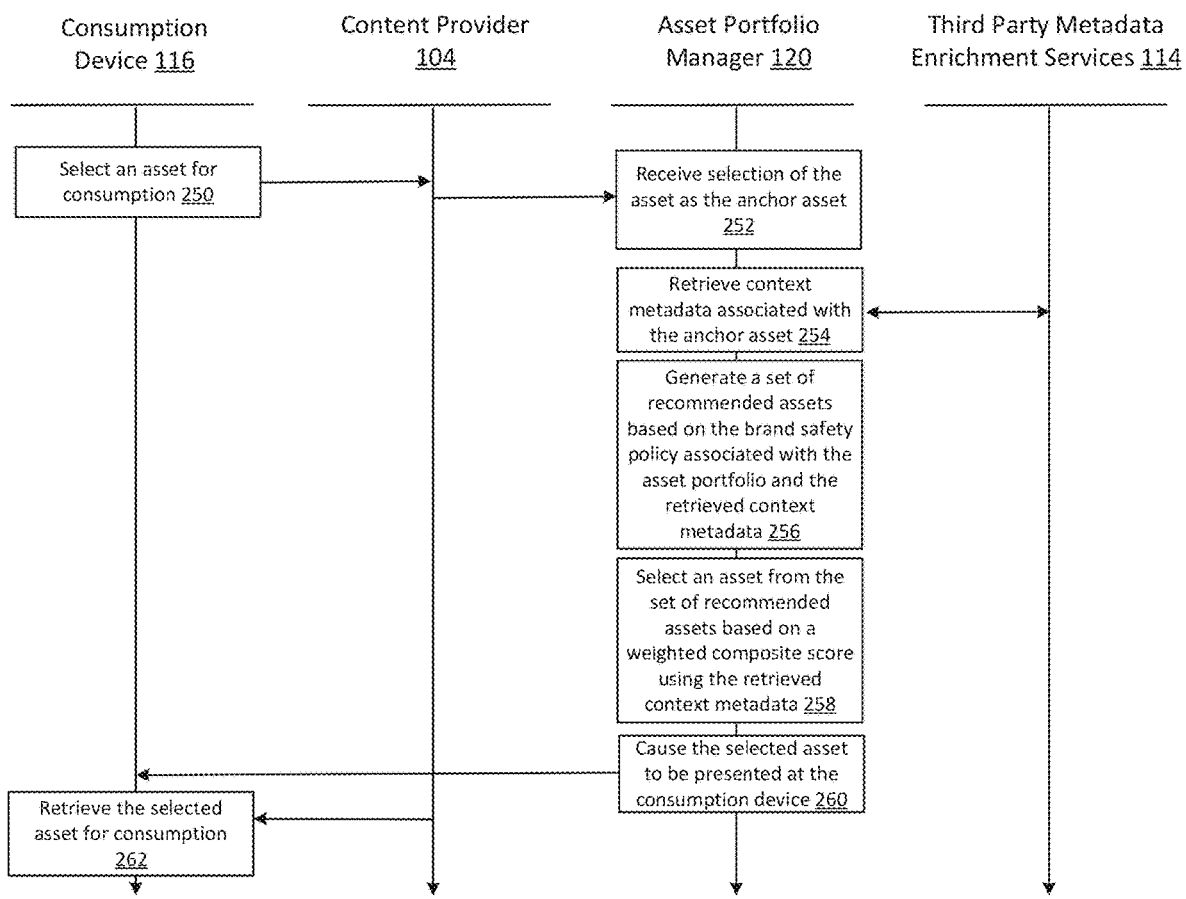
FIG. 2B illustrates an example high-level interaction flow diagram.

FIG. 2B illustrates an example interaction flow diagram. A consumption device 116 enables a user to select an asset for consumption in block 250. This selection is communicated to a content provider 104 through one or more networks 210 through an application program interface 222, in an embodiment. The content provider 104 communicates the selection of the asset to the asset portfolio manager 120 through an application program interface 222. In this way, the asset portfolio manager 120 receives selection of the asset as the anchor asset in block 252. The asset may be referred to as an "anchor" asset because the asset portfolio manager 120 uses the anchor asset to determine a set of recommended assets based on the contextual metadata determined by one or more enrichment services. The contextual metadata is found in the anchor asset as a result of the enrichment services determining the contextual metadata.

In block 254, the asset portfolio manager 120 retrieves context metadata associated with the anchor asset. The context metadata may be provided by one or more third party metadata enrichment services 114, previously or at the time of consumption. In block 256, the asset portfolio manager 120 generates a set of recommended assets based on the brand safety policy associated with the asset portfolio and the retrieved context metadata. The anchor asset is included in the asset portfolio, and a brand safety policy is applied to each asset in the asset portfolio. The brand safety policy is defined by a publisher of the asset portfolio through an interface, such as, for example, an application programming interface or user interface. The set of recommended assets are generated by one or more components of the asset portfolio manager 120, such as, for example, the recommendation engine 106 and weighted score generator 218.

In block 258, the asset portfolio manager 120 selects an asset from the set of recommended assets based on a weighted composite score using the retrieved context metadata. The weighted composite score for each recommended asset is generated by the weighted score generator 218 using the retrieved context metadata. In block 260, the asset portfolio manager 120 causes the selected asset to be presented at the consumption device. The asset portfolio manager 120 communicates the selected asset to the content provider 104 through an application program interface 222, in one embodiment. The consumption device 116 retrieves the selected asset for consumption in block 262 from the content provider 104. For example, the selected asset may be received in a playlist of upcoming content items as provided by the content provider 104. In another example, the selected asset may be received as a midroll ad inserted for playback while the user is still viewing the anchor asset.

3.0 Example Embodiments

Figure 3:
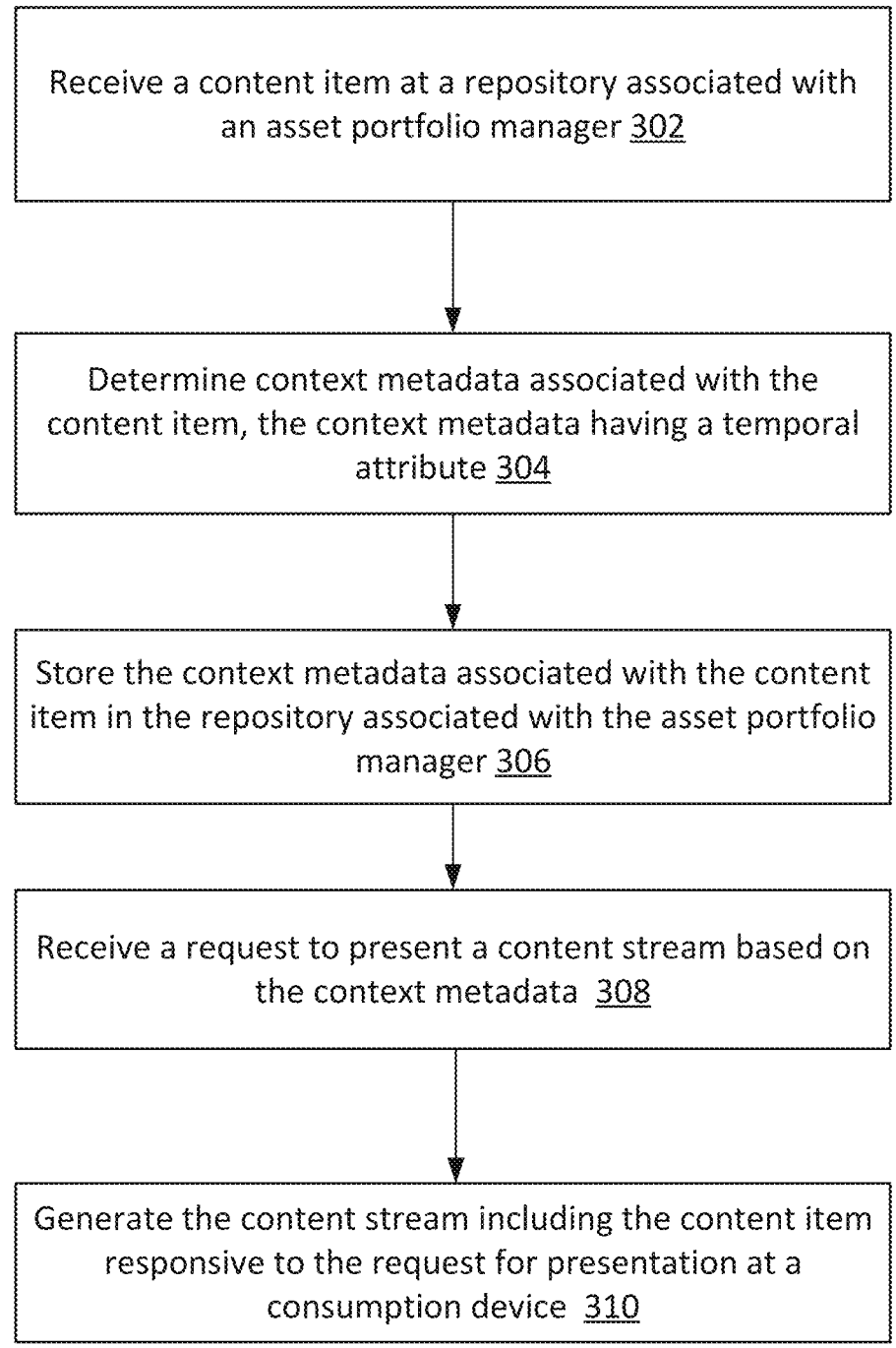
FIG. 3 illustrates an example process flow.

FIG. 3 illustrates an example process flow that may be implemented by a computing system (or device) as described herein. In block 302, an asset portfolio manager 120 (e.g., 120 of FIG. 1A, etc.) receives a content item at a repository associated with the asset portfolio manager. In one embodiment, the content item is an asset that has been selected to be viewed or is being viewed at a consumption device. The content item may be referred to as an "anchor" asset because the asset portfolio manager 120 uses the anchor asset to determine a set of recommended assets based on the contextual metadata determined by one or more enrichment services. The contextual metadata is found in the anchor asset as a result of the enrichment services determining the contextual metadata. In an embodiment, the content item is generated by a content provider and the asset portfolio manager 120 receives the content item for processing. In another embodiment, the content item may be generated by a process, method, service or technique connected to the asset portfolio manager 120 and communicated to the asset portfolio manager 120 through the communications interface 212. In a further embodiment, the content item may be generated by the asset portfolio manager 120.

In block 304, the asset portfolio manager (e.g., 120 of FIG. 1A, etc.) determines context metadata associated with the content item, the context metadata having a temporal attribute. In an embodiment, the context metadata is determined based on submitting a request to a metadata enrichment service. The request returns a response that includes the context metadata. For example, a content file including an image of a corporate logo may return context metadata comprising an identifier associated with the corporate logo.

In block 306, the context metadata associated with the content item is stored in the repository associated with the asset portfolio manager 120. Returning to the above example, the identifier associated with the corporate logo is stored in the asset store 102 as illustrated in FIG. 1A.

In block 308, a request to present a content stream based on the context metadata is received. For example, the asset portfolio manager 120 may receive a request from a content provider 104, as shown in FIG. 2A, to generate a content stream, such as an asset playlist 202, based on the context metadata generated by the enrichment process 112.

In block 310, the content stream including the content item is generated responsive to the request for presentation at a consumption device. The content stream includes the content item based on the request for the context metadata.

Figure 4:
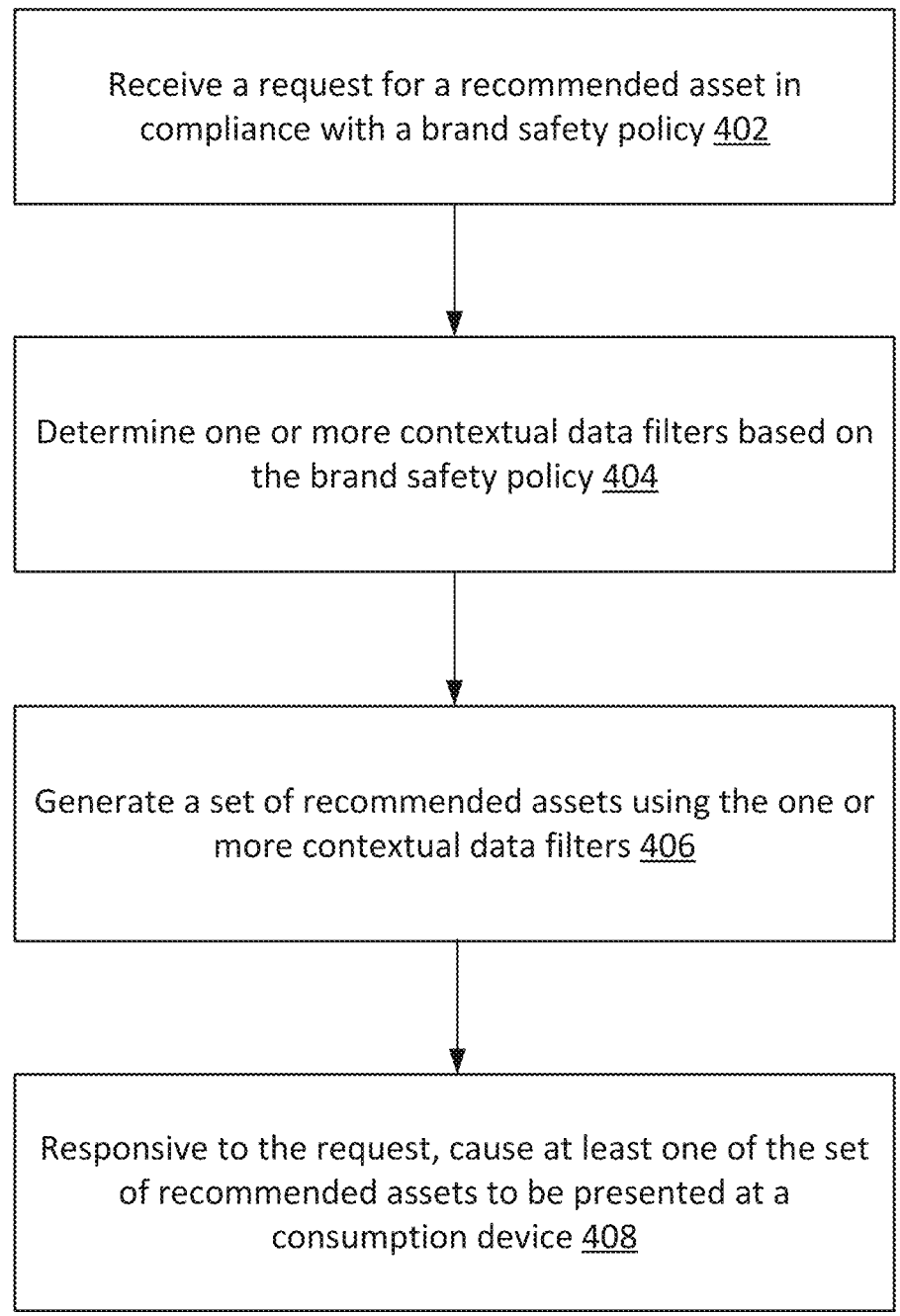
FIG. 4 illustrates an example process flow.

FIG. 4 illustrates another example process flow that may be implemented by a computing system (or device) as described herein. In block 402, a request for a recommended asset in compliance with a brand safety policy is received by the asset portfolio manager (e.g., 120 of FIG. 1, etc.). For example, a viewing user operating a consumption device 116 may have just completed viewing a digital media asset, such as a streaming video clip on "gardening" and the content provider 104 may issue a request from the asset portfolio manager 120 to generate a set of recommended assets that are compliant with a previously configured brand safety policy.

In block 404, one or more contextual data filters are determined based on the brand safety policy by the asset portfolio manager 120. Contextual data filters may include, for example, a blacklist of offensive content, a whitelist of a category of content, and so forth, in an embodiment.

In block 406, a set of recommended assets is generated by the recommendation engine 106 of the asset portfolio manager 120 using the one or more contextual data filters. The weighted score generator 218 may generate the composite scores, in an embodiment, that are used to generate the set of recommended assets by the recommendation engine 106.

In block 408, responsive to the request, at least one of the set of recommended assets is caused to be presented at a user device, such as consumption device 116, by the asset portfolio manager 120. The presentation of at least one of the set of recommended assets may be in the form of a graphical image, presentation of the digital media asset, and/or a text response on a graphical interface provided by the communications interface 212, or an application event executing on an application 206 operating on a consumption device 116 communicated through an application programming interface (API) as provided by the communications interface 212. The presentation of at least one of the set of recommended assets may further include causing the recommended asset to be streamed from the content provider 104 or played via the content provider 104 or other content sources 208 via the network(s) 210, in various embodiments.

Figure 6:
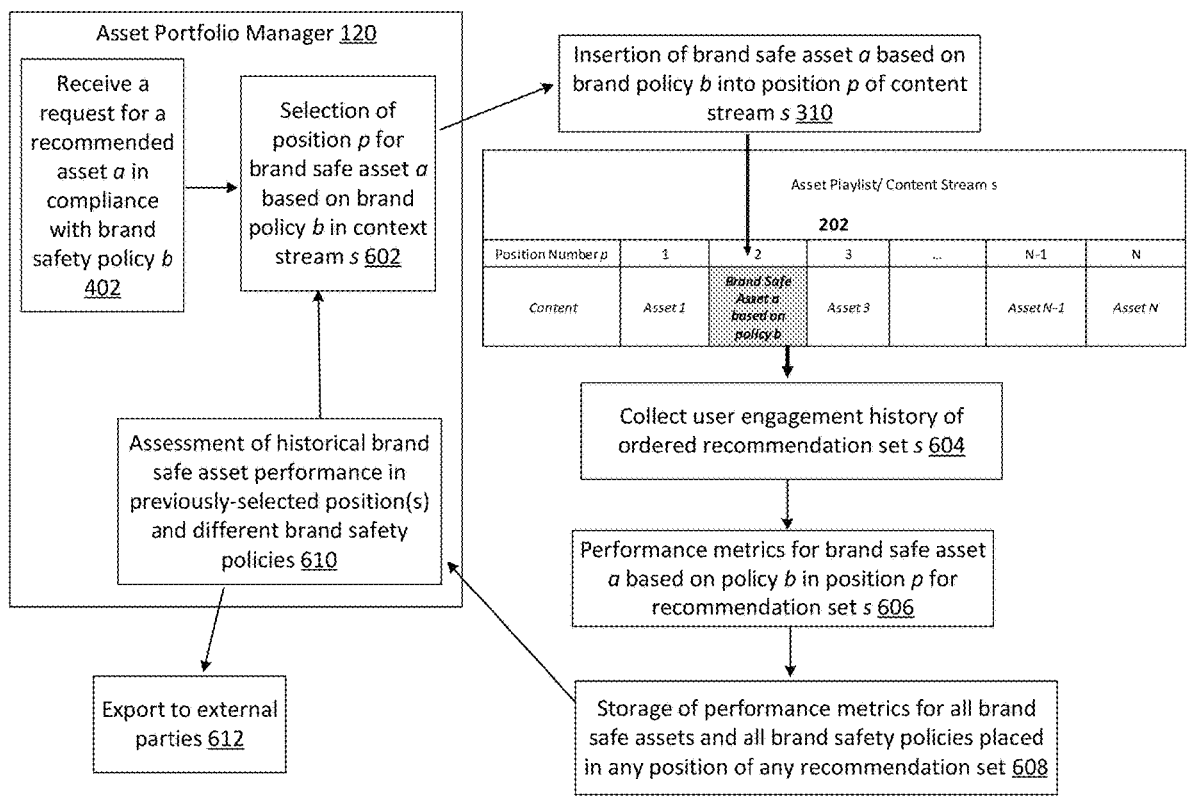
FIG. 6 illustrates an example high-level block diagram.

FIG. 6 illustrates an example high-level block diagram. In FIG. 6, various brand safety policies may be implemented where the performance of those policies is collected and analyzed to determine which policy yields the best performance. Initially, thresholds are set by the publisher and/or content provider based on what they believe is an appropriate level of risk. More risk aversion leads to a higher threshold. The thresholds are embedded in the process performed by the brand safety policy manager 130. Algorithmically, as various policies (e.g., thresholds and conflict management) are implemented, the policy that yields the highest performance would be determined to be the "best" for that asset and could be used by the brand safety policy manager 130 in the future for that asset. In one embodiment, the "best" policy for one asset may be used for other assets in the same category. "Best" performance means the threshold and/or conflict management-based policy that yields the highest revenue per stream for the ad. The asset portfolio manager 120 may programmatically choose to insert an asset into a recommended playlist/content stream 202 that has been determined to be brand safe by the brand safety policy manager 130. Enrichment services 114 provide a statistical probability that an asset is brand safe. The asset enrichment is accompanied by an assignment probability ranging from 0.0 to 1.0 where a value of 1.0 indicates that the asset is 100% brand safe and a value of 0.0 indicates that there is a 0% likelihood that the asset is brand safe. The 0.0-1.0 continuous scale may be mapped to discrete ranges determined by the brand safety policy manager 130. For example, if the probability is associated with brand safety, then the brand safety policy manager 130 may assign discrete ranges as; "Not brand safe" [0.0-0.25). "Possibly not brand safe" (0.25-0.75], and "Brand safe" (0.75-1.0]. The thresholds for the boundaries of the discrete 'brand safe' assessment can be determined by the brand safety policy manager 130 and possibly used to manage conflicts. In one embodiment, an administrator of the brand safety policy manager 130 may determine the thresholds for the boundaries of what constitutes brand safety. In another embodiment, the thresholds may be determined algorithmically based on the performance feedback loop described in FIG. 6. The implemented selection of thresholds represents a 'brand safety policy', for example "a likelihood below 0.25 is not brand safe" would be a brand safety policy.

Thresholds may be used to manage conflicts based on the level of risk aversion of the decision maker. For example, if the threshold for 'not brand safe' by one party (e.g., a publisher) is any assessed likelihood less than 0.50 while the advertiser (e.g., content provider) has a threshold of 'not brand safe' for anything less than 0.80, then an asset with an assessed likelihood of 0.40 would result in no conflict because both brand safety policies would label that as 'not brand safe.' Additionally, an asset with an assessed likelihood of 0.90 would also result in no conflict because both brand safety policies would label that as 'brand safe.' However, an asset with an assessed likelihood of 0.70 would be 'brand safe' for the publisher but 'not brand safe' for the advertiser, meaning that a conflict arises. Possible resolutions to the conflict using thresholds would include a risk-averse policy that would label it 'not brand safe' by using the highest threshold (e.g., the advertiser's threshold of 0.80). A risk-tolerant policy would label it 'brand safe' by using the lowest threshold (e.g., the publisher's threshold of 0.50). A risk-neutral approach may be taken by averaging the thresholds (e.g., the average of 0.50 and 0.80 is 0.65) and so the asset would be determined to be 'brand safe' because 0.70 is greater than 0.65.

A brand-safety policy b may have been used to determine that an asset was considered to be "brand safe" by the brand safety policy manager 130. The asset portfolio manager 120 may receive a request to place a brand safe asset a into content stream 402. A determination is then made 602 of the position where the brand safe asset a may be placed in the content stream 202. When the asset is inserted 310 into the content stream 202, it becomes available for consumption by the end user. At the end of each engagement, the outcomes of the engagement based on the insertion of a brand-safe asset a in position p using brand policy are collected 604 and added to historical performance of the action is stored 606. Across all engagements under various brand policies and assets, the data is stored 608 for further analysis. The asset portfolio manager 120 may then use historical data to determine the frequency at which various brand safety and position placements have been implemented 610 and the degree to which those features performed. For example, this data may be generated in reports to be presented to an administrator or brand manager users. This assessment may be leveraged by the brand safety policy manager 130 and asset portfolio manager 120 as they make future decisions on asset placement and brand safety policy-making.

The data and analysis reflecting historical performance of a various assets presented under a specific brand policy may be exported 612 to devices or media to include an interface, such as a physical interface, a graphical interface (e.g., a graphical user interface, etc.), a printed report, data file, an application programming interface (API), or combination thereof. This historical data and analysis may be provided to the publisher (such as "CNN"), the content provider (such as a political campaign, public emergency service an ad agency, or the creator of the content) to enable more precise content generation and brand policy formulation that targets the intended audience more effectively in future engagements. Any changes in brand policy made by the publisher and/or content provider may be reflected in future decisions by the brand safety policy manager 130 who resolves policy conflicts. Engagements in the content stream reflecting the de-conflicted (if appropriate) brand safety policy and selected assets will be processed according to FIG. 6 under a different brand policy b.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
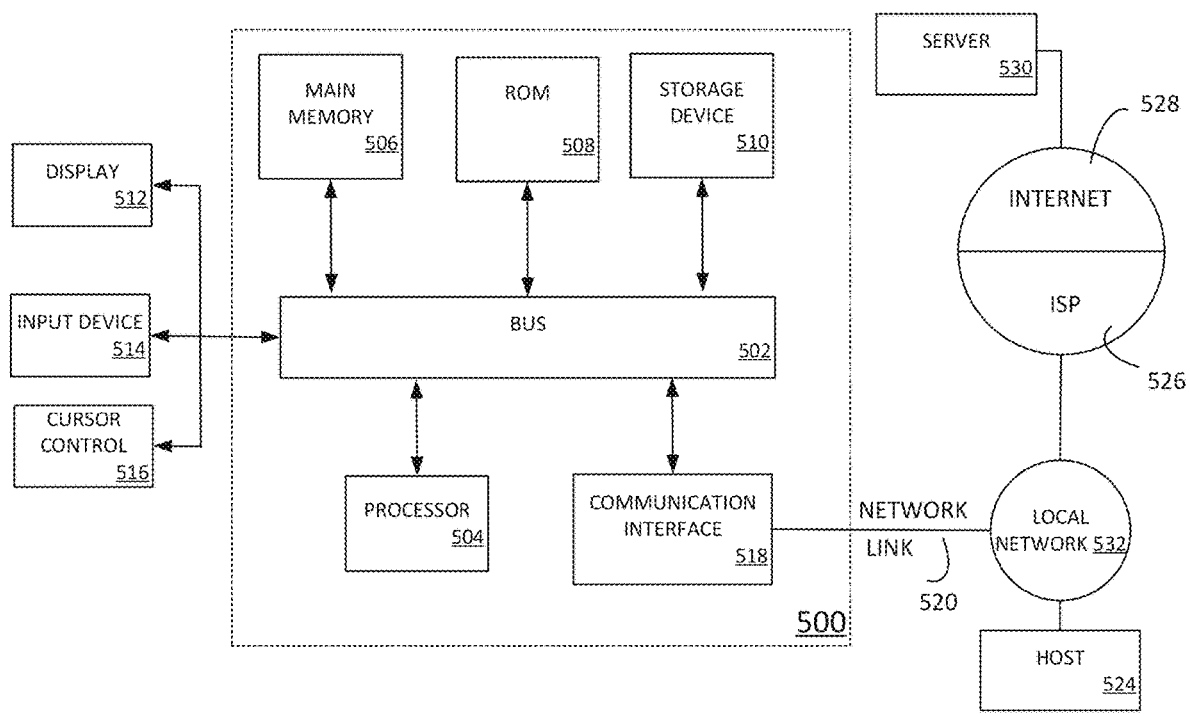
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
  receiving, by one or more processors of an electronic asset server system from a consumption user computing device and based on user interaction data captured by the consumption user computing device, a selection of a first digital media content item as an anchor electronic asset, the first digital media content item included in an electronic asset portfolio, the electronic asset portfolio having a brand safety policy defined by a digital content publisher of the electronic asset portfolio and the brand safety policy applied to each electronic asset in the electronic asset portfolio;

responsive to receiving the selection of the first digital media content as the anchor electronic asset, performing:

applying at least one digital media enrichment more digital media computing techniques to the first digital media content;

extracting, by the at least one digital media enrichment service, digital media context metadata associated with the anchor electronic asset from the first digital media content;

retrieving, by the one or more processors of the electronic asset server system from the at least one digital media enrichment service and based at least in part on the first digital media content, the digital media context metadata associated with the anchor electronic asset;

generating a set of recommended digital media content items, by the one or more processors of the electronic asset server system and based at least in part on the brand safety policy associated with the electronic asset portfolio and the digital media context metadata associated with the electronic anchor asset;

selecting a second digital media content item from the set of recommended digital media content items by the one or more processors of the electronic asset server system and based on a weighted composite score using second digital media context metadata associated with the second digital media content item;

sending, by the one or more processors of the electronic asset server system to the consumption user device, a digital media playlist that includes the set of recommended digital media content items to cause the second digital media content item to be presented for viewing in a graphic user interface at the consumption user computing device.

2. The method of claim 1, wherein the digital media context metadata comprises one or more keywords extracted from a transcript of the anchor electronic asset.

3. The method of claim 1, wherein the digital media context metadata comprises an identifier of an item visually depicted in the anchor electronic asset.

4. The method of claim 1, wherein the digital media context metadata comprises an identified logo visually depicted in the anchor electronic asset.

5. The method of claim 1, wherein the digital media context metadata comprises an analysis of an event happening in the anchor electronic asset.

6. The method of claim 1, wherein the digital media context metadata comprises sentiment information about the anchor electronic asset.

7. The method of claim 1, wherein the digital media context metadata comprises temporal attribute information associated with one or more clusters of frames of the anchor electronic asset, and wherein the second digital media content item comprises a targeted digital media content item placed after the one or more clusters of frames of the anchor electronic asset based on the temporal attribute information and the brand safety policy.

8. A system comprising:
one or more processors;
one or more non-transitory computer-readable media, storing one or more sequences of instructions, wherein execution of the one or more sequences of instructions by the one or more processors causes the one or more processors to perform:

receiving, by one or more processors of an electronic asset server system from a consumption user computing device and based on user interaction data captured by the consumption user computing device, a selection of a first digital media content item as an anchor electronic asset, the first digital media content item included in an electronic asset portfolio, the electronic asset portfolio having a brand safety policy defined by a digital content publisher of the electronic asset portfolio and the brand safety policy applied to each electronic asset in the electronic asset portfolio;

responsive to receiving the selection of the first digital media content as the anchor electronic asset, performing:

applying, by at least one digital media enrichment service, one or more digital media computing techniques to the first digital media content;

extracting, by the at least one digital media enrichment service, digital media context metadata associated with the anchor electronic asset from the first digital media content;

retrieving, by the one or more processors of the electronic asset server system from the at least one digital media enrichment service and based at least in part on the first digital media content, the digital media context metadata associated with the anchor electronic asset;

generating a set of recommended digital media content items, by the one or more processors of the electronic asset server system and based at least in part on the brand safety policy associated with the electronic asset portfolio and the digital media context metadata associated with the electronic anchor asset;

selecting a second digital media content item from the set of recommended digital media content items by the one or more processors of the electronic asset server system and based on a weighted composite score using second digital media context metadata associated with the second digital media content item;

sending, by the one or more processors of the electronic asset server system to the consumption user device, a digital media playlist that includes the set of recommended digital media content items to cause the second digital media content item to be presented for viewing in a graphic user interface at the consumption user computing device.

9. The system of claim 8, wherein the digital media context metadata comprises one or more keywords extracted from a transcript of the anchor electronic asset.

10. The system of claim 8, wherein the digital media context metadata comprises an identifier of an item visually depicted in the anchor electronic asset.

11. The system of claim 8, wherein the digital media context metadata comprises an identified logo visually depicted in the anchor electronic asset.

12. The system of claim 8, wherein the digital media context metadata comprises an analysis of an event happening in the anchor electronic asset.

13. The system of claim 8, wherein the digital media context metadata comprises sentiment information about the anchor electronic asset.

14. The system of claim 8, wherein the digital media context metadata comprises temporal attribute information associated with one or more clusters of frames of the anchor electronic asset, and wherein the second digital media content item comprises a targeted digital media content item placed after the one or more clusters of frames of the anchor electronic asset based on the temporal attribute information and the brand safety policy.

15. One or more non-transitory computer-readable media, storing one or more sequences of instructions, wherein execution of the one or more sequences of instructions by one or more processors causes the one or more processors to perform:

receiving, by one or more processors of an electronic asset server system from a consumption user computing device and based on user interaction data captured by the consumption user computing device, a selection of a first digital media content item as an anchor electronic asset, the first digital media content item included in an electronic asset portfolio, the electronic asset portfolio having a brand safety policy defined by a digital content publisher of the electronic asset portfolio and the brand safety policy applied to each electronic asset in the electronic asset portfolio;

responsive to receiving the selection of the first digital media content as the anchor electronic asset, performing:

applying at least one digital media enrichment more digital media computing techniques to the first digital media content;

extracting, by the at least one digital media enrichment service, digital media context metadata associated with the anchor electronic asset from the first digital media content;

retrieving, by the one or more processors of the electronic asset server system from the at least one digital media enrichment service and based at least in part on the first digital media content, the digital media context metadata associated with the anchor electronic asset;

generating a set of recommended digital media content items, by the one or more processors of the electronic asset server system and based at least in part on the brand safety policy associated with the electronic asset portfolio and the digital media context metadata associated with the electronic anchor asset;

selecting a second digital media content item from the set of recommended digital media content items by the one or more processors of the electronic asset server system and based on a weighted composite score using second digital media context metadata associated with the second digital media content item;

sending, by the one or more processors of the electronic asset server system to the consumption user device, a digital media playlist that includes the set of recommended digital media content items to cause the second digital media content item to be presented for viewing in a graphic user interface at the consumption user computing device.

16. The one or more non-transitory computer-readable media of claim 15, wherein the digital media context metadata comprises one or more keywords extracted from a transcript of the anchor electronic asset.

17. The one or more non-transitory computer-readable media of claim 15, wherein the digital media context metadata comprises an identifier of an item visually depicted in the anchor electronic asset.

18. The one or more non-transitory computer-readable media of claim 15, wherein the digital media context metadata comprises an identified logo visually depicted in the anchor electronic asset.

19. The one or more non-transitory computer-readable media of claim 15, wherein the digital media context metadata comprises an analysis of an event happening in the anchor electronic asset.

20. The one or more non-transitory computer-readable media of claim 15, wherein the digital media context metadata comprises sentiment information about the anchor electronic asset.

21. The one or more non-transitory computer-readable media of claim 15, wherein the digital media context metadata comprises temporal attribute information associated with one or more clusters of frames of the anchor electronic asset, and wherein the second digital media content item comprises a targeted digital media content item placed after the one or more clusters of frames of the anchor electronic asset based on the temporal attribute information and the brand safety policy.

* * * * *